United States Patent Office 3,516,837
Patented June 23, 1970

3,516,837
FLAMMABLE MIXTURE UTILIZED IN SERVING OF FOOD
Samuel Klein, 135 Eastern Parkway,
Brooklyn, N.Y. 11238
No Drawing. Filed Aug. 11, 1966, Ser. No. 571,698
Int. Cl. A23l 1/22
U.S. Cl. 99—144      6 Claims

ABSTRACT OF THE DISCLOSURE

A non-potable highly flammable solution, for serving foods enveloped in flames containing fruit juices, wine, spice, alcohol and sufficient salt to render the solution non-potable.

---

This invention pertains to flammable mixtures and particularly to flammable mixtures utilized in the service of food.

A flambe is a food served enveloped in flaming spirits. Restaurants around the world have traditionally served such diverse dishes as Steak Diane and Plum Pudding enhanced by the presence of flames. Not only is the drama of gourmet dining intensified when the entree or dessert is enveloped in flames, but so too is the flavoring of the various foods; the ingredients present in the flaming spirits lend their particular accents and nuances to the food.

It is well known that a flaming product, to be ignitable at average room temperature, must have an alcoholic proof of approximately one hundred. However, a product meeting this minimum standard may still fail to ignite when diluted by the natural food juices and sauces used in the preparation of the meal. The obvious expedient of employing higher proof spirits to overcome this problem has been found unsatisfactory, not only because of their higher cost, but also because higher proof spirits, e.g., rum, may add an undesirable nuance to many gourmet dishes. In addition, the incentive to pilferage is always present.

An alternative solution has been to heat the serving dish to a temperature of approximately 180 degrees Fahrenheit to facilitate ignition of the flambe product. However, heating results in an unsatisfactory loss of the delicate nuances of flavor present in the juices, wines and liquors used in serving the food. In addition, another undesirable effect is that a quickly expiring flame is yielded. This is due to the fact that the hot alcohol vaporizes rapidly instead of just burning at the surface. At times, the alcoholic liquid is heated in a ladle and ignited. This entails the danger of spillage of flaming liquids and detracts from the elegance required in the Service of Flaming Foods.

Another frequently employed technique to improve the flaming characteristic is the addition of sugar to a heated serving pan. The undesirable effects of this technique is the carmelizing of the sugar and darkening of the food, often with resultant scorching of both the food and the serving pan. Furthermore, a sweet flavor is then present which is often highly undesirable.

Another problem present in prior art flaming products and techniques is compliance with various governmental regulations, both national and local. In order to be classified under such regulations as a non-beverage, i.e. non-potable per se, the flammable mixture must contain denaturants. In the prior art, the technique employed is to add essential oils, such as lemon or orange oil, to the flambe product to render it non-potable in accordance with the requirements of Federal Regulatory Agencies. Essential oils are natural irritants and, as such, are effective in rendering the flambe product non-drinkable thus permitting classification as a non-beverage. However, when essential oils are added in sufficient quantity to render the product non-potable, the resultant product imparts an undesirable taste and "bite" or sting to the flamed food. The flaming product thus detracts from, rather than enhances and accentuates, the natural food flavors.

It is therefore an object of the present invention to produce a flammable mixture free of the disadvantages of prior art products.

Another object of the present invention is to produce a product for serving foods enveloped in flames which is readily ignitable at average room temperature.

Yet, another object of this invention is to produce a flammable product which complements and accentuates the natural flavors of food upon which it is employed.

Still another object of the invention is to produce a flammable product in which non-potability is achieved in a manner which renders the product a complementary addition to foodstuffs upon flaming.

By the practice of this invention, a flammable mixture, i.e. a flambe liquid, is produced which is more easily ignitable at average room temperatures, has a longer lasting flame, and more completely complements the flavor of served food than those products known in the prior art. The mixture is rendered a non-beverage by the addition of certain ingredients, discussed hereinafter, which also render the product eminently satisfactory for use as a flambe. More particularly, the mixture comprises fruit juices or concentrates thereof, wines, a natural flavoring concentrate, U.S.P. alcohol, and salt, e.g. sodium chloride, in predetermined amounts.

These and further features and objects of this invention, its nature and various advantages, may be more readily and fully understandable from the following detailed illustrative description.

The flambe mixture of this invention is generally employed in small quantities, e.g. a half ounce or less per serving. The mixture by itself, or in combination with rums and brandies (which add their own distinctive flavor effects), is poured upon the food and ignited. The inflammable components of the mixture are consumed and the remaining residue adds a desired flavor to the dish. Since the flavor desired varies with the food served, some of the ingredients of the mixture described herein may, of course, be replaced with other flavoring ingredients.

As stated above, an important criterion of an acceptable flambe mixture is that it be non-potable, viz that it is undesirable as a beverage in its liquid state. It has been discovered that a predetermined quantity of salt, e.g., sodium chloride, when properly combined with other ingredients produces a flambe mixture which satisfies the above criterion. It is well known that salt is universally accepted as a food additive in that while it imparts a desirable flavoring effect, of itself, to the food; it is also simultaneously effective in accentuating the natural flavor of the food. When utilized in the present invention, in prescribed amounts, this characteristic, when coupled with another characteristic of salt, yields a highly desirable result. The other characteristic is that salt when present in solution, in sufficient quantities, renders the solution highly non-potable as a beverage.

As an illustrative example of this invention, a gallon of flambe solution is prepared in the following manner. Quantities designated are, of course, approximate and may be varied to produce different flaming and flavoring effects. Five to seven ounces of fruit juices or fruit juice concentrates of desired flavor or type, are placed in a receptacle, e.g., a tank. It has been found that, among others, fruit juices such as apple, apricot, blackberry, blueberry, boysenberry, cherry, crabapple, currant, elderberry, grape, guava, mango, passion fruit, peach, pineapple, plum, raspberry, strawberry, etc., or combinations thereof, produce a suitable product. One half to two and one half ounces of sodium chloride are then added to the fruit juice. A suitable product may also be obtained by using three quarters to three ounces of calcium chloride, potassium chloride, or combinations thereof. The solution is thoroughly intermixed and allowed to stand approximately twelve hours. After this step, eight to twelve ounces of wine are added to the mixture. Any wine may be used, depending upon the flavor desired. For example, a sherry has been found suitable in general use. More particularly, diverse high proof wines such as marsala, muscatel, port, tokay, severally, or in combination with sherry, produce a satisfactory product. Low proof wines such as burgundy, chablis, chianti, concord grape, sauterne, rhine wine, etc., have also been utilized. It should be noted that if it is desired to reduce costs the fruit juices and wines may be replaced with water or vegetable juices, such as tomato, beet, watermelon, etc. Solvents such as glycerin or propylene glycol also may be used. The resultant mixture is stirred until the wine is completely dissolved in solution. To this solution is added ten ounces of U.S.P. alcohol. Again, the solution is thoroughly intermixed and allowed to stand for twelve hours.

Depending upon the various flavor effect desired, a suitable spice base concentrate is independently prepared. As well known by those skilled in the art, the concentrate may comprise a combination of numerous flavor ingredients, for example, natural spices, a small amount of essential oils, such as lemon extract or orange extract, botanicals, natural extractives of plant parts and other natural flavor raw materials. In addition, synthetic flavoring materials may be used to reduce costs, to achieve special flavor effects, or to fortify natural flavorings. For example, undica lactone added to a natural peach or apricot flavor is suitable. It is to be understood that the various constituents of the concentrate may be changed at will, as required.

Two to five ounces of the desired spice base concentrate are placed in an independent container. Approximately ten ounces of U.S.P. alcohol are added to the concentrate. This mixture is stirred and allowed to stand for approximately twelve hours. The mixture of concentrate and alcohol is then added to the initial solution of fruit juices, wine and sodium chloride. Ninety to ninety five ounces of U.S.P. alcohol are then added to the resulting solution which is then stirred for approximately thirty minutes at twenty four hour intervals for three or four days. The final solution is then filtered and packaged as desired, e.g., bottled or canned.

Even more particularly, approximately a gallon of flambe liquid may be prepared in the following manner. Dissolve one ounce of sodium chloride in five ounces of apple juice. Mix the solution and allow it to stand for twelve hours. Add eight ounces of sherry wine to the solution, stir until the wine is completely dissolved and then add ten ounces of U.S.P. alcohol. Mix the solution thoroughly and allow it to stand for twelve hours. To three ounces of a spice base concentrate, in a separate container, add ten ounces of U.S.P. alcohol. The spice base concentrate, as discussed above, may be any desired concentrate well known to those versed in the art. Stir the concentrate solution and allow it to stand for twelve hours. Add the concentrate solution, and ninety ounces of U.S.P. alcohol, to the previously prepared solution. Stir the resultant mixture for thirty minutes at twenty four hour intervals for three days and then filter. A half ounce of the filtered solution, poured over a food serving and ignited, has been found to produce a highly satisfactory flame which is long lasting.

A resultant typical product thus constitute approximately 82% alcohol, by volume. A product containing 70% alcohol to 90% alcohol by volume of the total solution has been found satisfactory. Consequently, ignition of the product is instantaneous while providing a flame of long duration. The presence of salt in solution in the prescribed amounts, indicated above, renders a product a non-beverage while permitting the solution to be of extremely high proof, as aforesaid. In addition, the salt constitutes a food additive applicable, without exception, to any foodstuff upon which it is employed. Thus, the resultant product of this invention is easily ignitable at room temperatures, has a long lasting and attractively colored flame, due to the dissolved salts, and also complements the flavor of the flamed food and complies with governmental regulations.

It is to be understood that the above description is merely illustrative of the principles of the invention and that further modifications may be implemented by those skilled in the art without departing from the spirit and scope of this invention. For example, various fruit juices and wines may be used or other substitutes utilized for those described herein. In addition a satisfactory product, though less desirable, may be produced by combining the above mentioned ingredients, in sequence, mixing the solution and then filtering, in a manner as aforesaid, in a lesser interval of time than that set forth herein.

What is claimed is:

1. A mixture for serving food comprising the relative proportions per gallon of approximately five to seven ounces of fruit juice, eight to twelve ounces of wine, two to five ounces of spice base concentrate, ninety to one hundred fifteen ounces of U.S.P. alcohol to render said mixture flammable and one half to two and one half ounces of salt to render said mixture non-potable.

2. The method of making a high alcoholic content, non-potable flambe solution comprising the steps of:
   preparing a solution of fruit juice and a predetermined quantity of salt, said salt being in an amount sufficient to render the final flambe solution non-potable as a beverage,
   mixing said solution,
   allowing said solution to stand for a predetermined interval of time,
   adding to said solution a predetermined quantity of wine to impart the desired flavor,
   adding to said wine-containing solution a predetermined quantity of U.S.P. alcohol, mixing said solution,
   allowing said solution to stand for a predetermined interval of time,
   adding to said alcohol-containing solution a spice base concentrate,
   adding to said spice base-containing solution a predetermined additional quantity of U.S.P. alcohol, the total amount of alcohol being an amount sufficient to render the flambe solution highly flammable,
   mixing the resulting solution, and
   allowing said solution to stand for a period of time whereby a non-potable highly flammable solution is produced for serving foods enveloped in flames, when said solution is poured over the desired food and ignited.

3. The method of making a flambe solution set forth in claim 2 wherein said quantity of salt constitutes one half to two and one half ounces by weight per gallon of the total flambe solution.

4. The method of making a flambe solution set forth in claim 2 wherein said predetermined interval of time is approximately twelve hours.

5. The method of making a flambe solution set forth in claim 2 wherein the total quantity of alcohol constitutes a percentage ranging from 70% to 90% by volume of the total flambe solution.

6. A method of making a flammable mixture used for serving foods comprising the steps of mixing a solution of a quantity of fruit juice and a quantity of salt wherein the salt constitutes one half to two and one half ounces of weight per gallon of the final total flammable mixture, adding to said solution predetermined quantities of alcohol of a quantity to render the final product highly flammable, wine to impart the desired flavor, and spice base concentrate, and mixing said solution, whereby a non-potable flammable solution is produced for serving foods enveloped in flames, when said solution is poured over the desired food and ignited.

References Cited

Cotton ed., Old Mr. Boston Deluxe Official Bartender's Guide, Mr. Boston Distiller Inc., Boston, Mass. 1963, p. 86.

Sunset Barbeque Cookbook, Lane Publishing Co., Menlo Park, Calif. 1954, pp. 31–34 and 42–44.

RAYMOND N. JONES, Primary Examiner

J. M. HUNTER, Assistant Examiner

U.S. Cl. X.R.

99—140; 252—366